(12) United States Patent
Kato et al.

(10) Patent No.: US 6,883,653 B2
(45) Date of Patent: Apr. 26, 2005

(54) DYNAMIC DAMPER

(75) Inventors: Kazuhiko Kato, Aichi (JP); Seiya Asano, Aichi (JP); Takanori Sugiura, Aichi (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 10/444,898

(22) Filed: May 23, 2003

(65) Prior Publication Data

US 2003/0218284 A1 Nov. 27, 2003

(30) Foreign Application Priority Data

May 27, 2002 (JP) .................................. 2002-153068

(51) Int. Cl.$^7$ ................................. F16F 7/10
(52) U.S. Cl. .................... 188/379; 464/180; 267/140.2
(58) Field of Search ................. 188/378, 379, 188/380; 464/180; 267/292, 136, 140.2

(56) References Cited

U.S. PATENT DOCUMENTS

| | | | | |
|---|---|---|---|---|
| 5,056,763 A | * | 10/1991 | Hamada et al. | 267/141 |
| 5,090,668 A | * | 2/1992 | Hamada | 267/141 |
| 5,593,144 A | * | 1/1997 | Hamada et al. | 267/141 |
| 5,884,902 A | * | 3/1999 | Hamada et al. | 267/141 |
| 6,308,810 B1 | * | 10/2001 | Kuwayama | 188/379 |
| 6,439,550 B1 | * | 8/2002 | Koch | 267/64.23 |
| 6,450,487 B1 | * | 9/2002 | Kuwayama | 267/141 |
| 6,485,370 B1 | * | 11/2002 | Kurosu et al. | 464/180 |
| 6,499,730 B1 | * | 12/2002 | Kuwayama et al. | 267/141 |
| 2001/0050203 A1 | * | 12/2001 | Kuwayama | 188/379 |

FOREIGN PATENT DOCUMENTS

| | | |
|---|---|---|
| EP | 0 409 202 A1 | 1/1991 |
| EP | 409202 * | 1/1991 |
| EP | 1 138 973 A2 | 10/2001 |
| JP | 7-47978 B1 | 9/1990 |
| JP | 5-71503 B1 | 9/1993 |
| JP | 6-45078 B1 | 11/1994 |
| JP | 6-45079 B1 | 11/1994 |
| JP | 8-28627 B1 | 2/1996 |
| JP | 8-28627 | 2/1996 |
| JP | 09210130 * | 8/1997 |
| JP | 9-210130 B1 | 8/1997 |
| JP | 10132027 * | 5/1998 |
| JP | 10-132027 B1 | 5/1998 |
| JP | 2000-55130 B1 | 2/2000 |
| JP | 2000-55130 | 2/2000 |
| JP | 3076718 B1 | 6/2000 |
| JP | 2000-320529 B1 | 11/2000 |
| JP | 2001-248683 B1 | 9/2001 |
| JP | 2001-280420 | 10/2001 |
| JP | 2001-280420 B1 | 10/2001 |
| JP | 2001349379 * | 12/2001 |

OTHER PUBLICATIONS

Searching PAJ, Patent Abstracts of Japan for Publication No. 02–221731 (Corresponding to Japanese Publication No. 7-47978—Cite. No. 2).

(Continued)

*Primary Examiner*—Robert A. Siconolfi
*Assistant Examiner*—Devon Kramer
(74) *Attorney, Agent, or Firm*—Darby & Darby

(57) ABSTRACT

A dynamic damper for damping vibration of a rotary shaft. The dynamic damper includes a tubular mass member and a rubber elastic member. The rubber elastic member includes an attachment tube press-fitted onto the rotary shaft and an arm. The attachment tube is disposed coaxially with the mass member but nearer to an axial center thereof than the mass member. The arm connects the attachment tube to the mass member. The attachment tube includes a tubular support portion connected to the arm, a tubular attachment portion, and a tubular coupling portion for coupling the tubular support portion with the tubular attachment portion. The tubular attachment portion has larger interference than the tubular support portion.

2 Claims, 5 Drawing Sheets

OTHER PUBLICATIONS

Searching PAJ, Patent Abstracts of Japan for Publication No. 07–248045 (Corresponding to Japanese Publication No. 7-248045—Cite No. 5).

Search PAJ, Patent Abstracts of Japan for Publication No.09–210130 (Cite. No. 6).

Searching PAJ, Patent Abstracts of Japan for Publication No. 10–132027 (Cite No. 7).

Searching PAJ, Patent Abstracts of Japan for Publication No. 2001–248683 (Cite No. 8).

Searching PAJ, Patent Abstracts of Japan for Publication No. 2000–320529 (Cite No. 10).

* cited by examiner

DYNAMIC DAMPER

BACKGROUND OF THE INVENTION

1. Field of the Invention

The present invention relates to a dynamic damper which is to be fitted onto an outer peripheral face of a rotary shaft such as a drive shaft of a vehicle, and which damps a vibration input produced on the rotary shaft.

2. Background Art

Conventionally, a dynamic damper of this kind comprises, for example, a tubular metallic mass, and a tubular rubber elastic member which extends from the inner peripheral face of the metallic mass toward the axial center. The rubber elastic member has an attachment tube which is placed on the side of the axial center, and an arm which couples the attachment tube with the metallic mass. The attachment tube is fitted by pressing onto an outer peripheral face of a rotary shaft such as a drive shaft in which vibrations are to be damped, whereby the metallic mass is elastically held onto the drive shaft. In the dynamic damper, in response to a harmful vibration input such as bending or torsional vibrations produced by rotation of the drive shaft, the rubber elastic member is compressively deformed by a resonance effect due to vibrations of the metallic mass, and the vibration input is absorbed and damped by the compression deformation. In the dynamic damper, in order to enhance the strength of attachment of the attachment tube to the drive shaft, a ring-like fastening band is fastened while being wound around a part of the attachment tube. According to the configuration, the dynamic damper is firmly positioned and fixed to the drive shaft, and axial movement of the dynamic damper due to vibrations of the drive shaft is suppressed, thereby enabling the dynamic damper to exhibit stable vibration absorption characteristics.

SUMMARY OF THE INVENTION

In order to firmly fix the dynamic damper to the drive shaft to prevent axial movement from occurring, the attachment tube of the dynamic damper must be fastened by the fastening band to be pressed against the drive shaft. Therefore, a work of conducting a fastening process by the fastening band is required in a step of attaching the dynamic damper, and the fastening band must be prepared as a separate member, thereby causing a problem in that the total cost including the attachment of the dynamic damper is high. When the degree of interference of press fitting of the attachment tube of the rubber elastic member onto the drive shaft is enhanced, the strength of attachment of the rubber elastic member to the drive shaft is increased. In this case, however, the degree of the compression of the rubber elastic member is very high, and hence the entire rubber elastic member easily collapses, thereby causing the probability that the durability may be impaired. Since the degree of interference of press fitting of the attachment portion onto the drive shaft is very high, there is another problem in that it is very difficult to conduct the work of pressingly fitting the dynamic damper onto the drive shaft.

The invention has been conducted in order to solve the above-discussed problems. It is an object of the invention to provide a dynamic damper which can be firmly fixed to a rotary shaft without using a fastening band, and in which the durability of a rubber elastic member can be adequately ensured, and the work of attachment to the rotary shaft is facilitated.

In order to attain the problems, the invention provides a dynamic damper for damping vibration of a rotary shaft, including: a tubular mass member; and a rubber elastic member that elastically supports the mass member on the rotary shaft, the rubber elastic member including an attachment tube and an arm both made of a rubber elastic material, the attachment tube disposed coaxially with the mass member but nearer to an axial center thereof than the mass member, the attachment tube to be press-fitted onto an outer peripheral face of the rotary shaft, the arm connecting the attachment tube to the mass member. The attachment tube includes: a tubular support portion including a part connected to the arm; a tubular attachment portion; and a tubular coupling portion for coupling the tubular support portion with the tubular attachment portion. The tubular attachment portion has larger interference than the tubular support portion where the interference is a value obtained by dividing a difference between an inner diameter before press fitting onto the rotary shaft and an outer diameter of the rotary shaft by the inner diameter before press fitting. Preferably, the tubular coupling portion is formed to prevent the tubular support portion from being affected by deformation of the tubular attachment portion due to press-fitting onto the rotary shaft.

According to this, the dynamic damper is fixed to the rotary shaft in which vibrations are to be damped, by pressingly fitting the attachment tube of the rubber elastic member onto the outer peripheral face of the rotary shaft, thereby allowing the mass member to be elastically supported by the rubber elastic member with respect to the rotary shaft. Since the degree of interference of the attachment portion of the attachment tube is larger than that of the support portion, the rubber elastic member is firmly fixed to the rotary shaft, mainly by the attachment portion. Even when a fastening band is not used, therefore, axial movement of the dynamic damper due to a vibration input from the rotary shaft is suppressed, and the attachment position is stably ensured. Since the degree of interference of the support portion of the attachment tube with which the arm is coupled to directly support the mass member is smaller than that of the attachment portion, collapse of the rubber elastic material is suppressed, and the durability is ensured. Furthermore, the coupling portion is disposed between the support portion and the attachment portion of the larger degree of interference, so that the support portion is prevented from being affected by compression deformation of the rubber elastic material in the attachment portion which is fitted by pressing onto the rotary shaft. In the dynamic damper, therefore, the support portion is uniformly fixed to the rotary shaft, and hence the vibration damping performance of the dynamic damper can be adequately maintained. In the rubber elastic member, the portion of a larger degree of interference is restricted to the attachment portion. In the entire rubber elastic member, therefore, also difficulty of the work of pressingly fitting onto the rotary shaft can be reduced.

Preferably, the tubular coupling portion is thinner than the tubular support portion and the tubular attachment portion.

Preferably, the tubular coupling portion has a predetermined buffer length in an axial direction.

The terms "buffer length" means the length of the coupling portion which is required for preventing the support portion from being affected by deformation of the attachment portion due to press fitting onto the rotary shaft. Since the coupling portion is thinner than the support portion and the attachment portion, or has a predetermined buffer length in the axial direction, large deformation of the rubber elastic material due to press fitting of the attachment portion of a larger degree of interference onto the rotary shaft is absorbed by the thinned part or the buffer length, and hence does not affect even the support portion. Therefore, the support portion can be uniformly fixed to the rotary shaft, so that the vibration damping performance of the rubber elastic member can be adequately maintained.

Preferably, the interference of the tubular support portion is 5 to 20%, and the interference of the tubular attachment portion is 20 to 50%.

Although the degree of interference of the support portion can be set to 5 to 20%, a preferable value of the degree of interference is about 10%. Although the degree of interference of the attachment portion can be set to 20 to 50%, a preferable value of the degree of interference is about 30%.

When the degree of interference of the support portion is in the range of 5 to 20% as described above, collapse of the support portion is suppressed, and the durability of the support portion member is ensured. When the degree of interference of the attachment portion is set to 20 to 50%, the strength of attachment of the attachment portion to the rotary shaft is sufficiently ensured, axial movement of the dynamic damper with respect to the drive shaft is suppressed, and the attachment position is stably ensured.

Preferably, the tubular attachment portion has an annular projection coaxially disposed on an inner peripheral face thereof.

In the case where an annular projection is disposed on the inner peripheral face of the attachment portion, when the rubber elastic member is fitted by pressing onto the rotary shaft, the attachment portion is more firmly pressed and fixed to the rotary shaft by the projection in addition to the strong pressing force due to the high degree of interference.

Preferably, a simple adhesive agent of a treatment liquid type including a halogenated polymer and polydinitrosobenzene is applied to an inner peripheral face of the attachment portion.

In the case where such a simple adhesive agent is applied to the inner peripheral face of the attachment portion, when the rubber elastic member is fitted by pressing onto the rotary shaft, the attachment portion is more firmly fixed to the rotary shaft by the adhesive force exerted by the simple adhesive agent in addition to the strong pressing force due to the high degree of interference.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
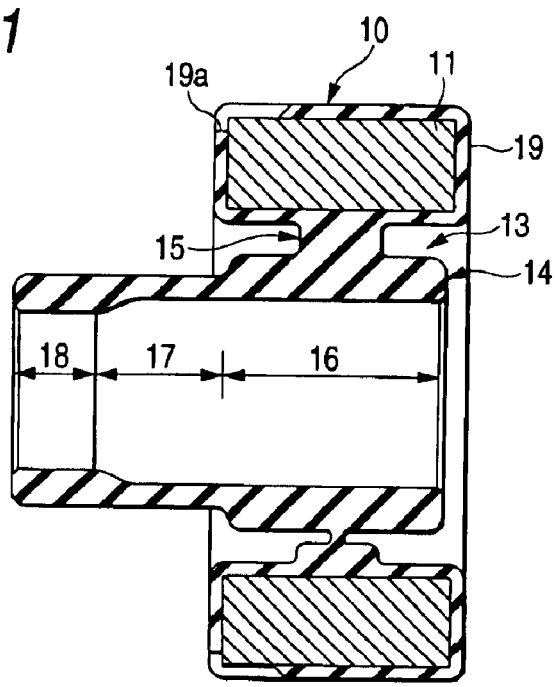
FIG. 1 is a section view taken along the line I—I of FIG. 2 showing a dynamic damper which is a first embodiment of the invention.
Figure 2:
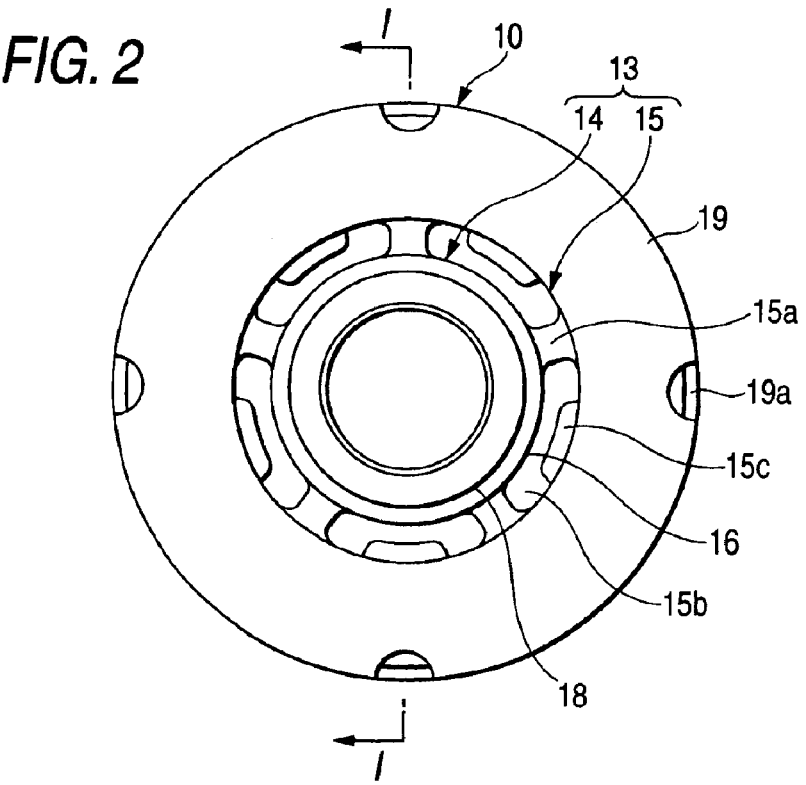
FIG. 2 is a left side view showing the dynamic damper.
Figure 3:
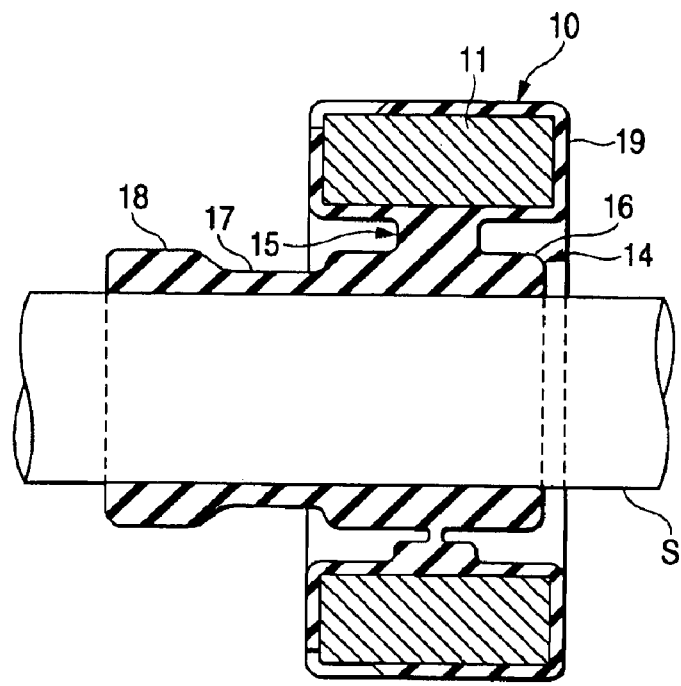
FIG. 3 is a section view taken along the axis showing a use state of the dynamic damper.

Hereinafter, an embodiment of the invention will be described with reference to the accompanying drawings. FIGS. 1 and 2 are a section view taken along the line I—I and a left side view showing a dynamic damper 10 which is a first embodiment, and which is to be attached to a drive shaft (rotary shaft) S of an automobile. FIG. 3 is a section view taken along the axis showing a state where the dynamic damper 10 is fitted by pressing onto the drive shaft S.

The dynamic damper 10 includes: a cylindrical metallic mass (tubular mass member) 11; a rubber elastic member 13 which extends from the inner peripheral face of the metallic mass 11 toward the axial center; and a rubber covering layer 19 which covers the surface of the metallic mass 11. The rubber elastic member 13 and the rubber covering layer 19 are formed integrally with the metallic mass 11 by the vulcanization and molding method and in an unbonded manner. The rubber elastic member 13 is configured by: a cylindrical attachment tube 14 which is coaxially disposed in an axially inner side of the metallic mass 11 with being separated therefrom by a predetermined distance, and which is to be fitted by pressing onto the outer peripheral face of the drive shaft S in which vibrations are to be damped; and an annular arm 15 which elastically couples the metallic mass 11 with the attachment tube 14.

The metallic mass 11 is a cylindrical thick metal member in which the axial length is shorter than that of the attachment tube 14. The metallic mass 11 is made of iron or an iron alloy, and formed by the cold or hot forging technique, the sintering metal process, the press winding process, or the like. A through hole may be formed in a part of the metallic mass, so that the rubber elastic material on the inner peripheral side of the metallic mass is coupled with that on the outer peripheral side via the rubber elastic material filled in the through hole, whereby the integration of the metallic mass and the rubber elastic material is enhanced. Alternatively, protrusions which are placed with being separated by gaps in the circumferential direction, and which slightly protrude toward the axial center may be disposed on the inner peripheral face of the metallic mass. According to the configuration, the integration of the metallic mass and the rubber elastic material is enhanced so that the metallic mass can be prevented from being circumferentially moved even when the metallic mass is not bonded to the rubber elastic member.

The attachment tube 14 has a generally cylindrical shape having an axial length which is longer than that of the metallic mass 11, and includes an attachment portion 18, a coupling portion 17, and a support portion 16. These portions are integrated with one another and arranged in the sequence starting from one axial end (the left end in FIG. 1) to the other end (the right end in FIG. 1). The support portion 16 is placed with being opposed to the metallic mass 11 via a gap in an inner radial direction, and has an axial length which is substantially equal to that of the metallic mass 11. The outer peripheral face of the support portion is slightly expanded in an outer radial direction with respect to the coupling portion 17 and the attachment portion 18, so that the support portion is a little larger in outer diameter than the coupling portion and the attachment portion. In the attachment portion 18, the inner peripheral face is expanded in an inner radial direction with respect to the support portion 16 and the coupling portion 17, so that the attachment portion is a little smaller in inner diameter than the support portion and the coupling portion. The coupling portion 17 is thinner than the support portion 16 and the attachment portion 18, and one axial end of the portion is connected to the attachment portion 18 with forming the inner peripheral face into an arcuate sectional shape.

The inner diameters of the support portion 16 and the attachment portion 18 are smaller than the outer diameter of the drive shaft S, and defined by respective degrees of interference with respect to the drive shaft S. Each of the degrees of interference is obtained by dividing the difference between the inner diameter of the corresponding one of the support portion 16 and the attachment portion 18 before the press fitting onto the drive shaft S and the outer diameter of the drive shaft S by the inner diameter before the press fitting. Usually, the degree of interference of the support portion 16 is about 10%, and may be in the range of 5 to 20%. Usually, the degree of interference of the attachment portion 18 is about 30%, and may be in the range of 20 to 50%.

The arm 15 extends from the outer peripheral face of the support portion 16 at an approximately intermediate axial position of the portion, to be in contact with the inner peripheral face of the metallic mass 11 at an approximately intermediate axial position of the portion. The arm 15 is annually configured by five main connecting parts 15a and five thin connecting parts 15b which are alternately arranged in the circumferential direction. The main connecting parts 15a have a generally quadrangular prism shape which is thick in the axial and width directions, and respectively extend in an outer radial direction from five places of the outer peripheral face of the attachment tube 14 which are arranged with being equally spaced in the circumferential direction. The thin connecting parts 15b have a thin membranous shape and circumferentially extend between the main connecting parts 15a to connect them together. A rubber projection 15c, slightly projecting from the side of the metallic mass 11, is disposed at the circumferentially intermediate position of each of the thin connecting parts 15b. The rubber projections 15c function as a stopper for restricting radial movement of the metallic mass 11. The numbers of the main connecting parts 15a and the thin connecting parts 15b are not limited to five.

The thin rubber covering layer 19 covers a substantially whole area of the inner face, the end faces, and the outer face of the metallic mass 11, and is integrated with the arm 15. In one axial end of the rubber covering layer 19, four places which are arranged in a circumferential direction at regular intervals correspond to positioning protrusions which are formed on dies for vulcanizing molding that will be described later, in order to position the metallic mass 11 with respect to the dies, and therefore formed as rubber-less portions 19a in which the rubber elastic material is not disposed.

The rubber elastic member 13 and the rubber covering layer 19 are integrated with each other by a vulcanization and molding process in which a rubber material at a high temperature is injected into the molding dies and subjected to a heat treatment while the metallic mass 11 to which an adhesive agent is not applied is placed in the dies, with the result that the dynamic damper 10 is obtained.

As shown in FIG. 3, the thus produced dynamic damper 10 is fitted by pressing with a manual operation or using a jig onto the outer periphery of the drive shaft S of a vehicle to which a press-fitting lubricant is applied, and fixed in the attachment tube 14. Before the press fitting of the rubber elastic member 13 onto the drive shaft S, a simple adhesive agent of the treatment liquid type which is composed of a halogenated polymer and polydinitrosobenzene is previously applied to the inner peripheral face of the attachment portion 18. A halogenated polymer has a structure in which part of hydrogen atoms of an aliphatic or aromatic polymer are replaced with halogen atoms. For example, chlorosuplfonated polyethylene (tradename: "HYPALON" produced by E. I. du Pont de Nemours and Company) is used as the halogenated polymer. The halogenated polymer is dissolved in a mixed solvent of xylene and trichloroethylene, and polydinitrosobenzene is mixed and dispersed in the resulting solution to produce treatment liquid. Preferably, the ratio of halogenated polymer is 70 to 65 wt. %, and that of polydinitrosobenzene is 30 to 35 wt. %. The application of the simple adhesive agent to the inner peripheral face of the attachment portion 18 may be omitted as required.

The dynamic damper 10 is fixed to the drive shaft S by fitting by pressing the rubber elastic member 13 onto the outer peripheral face of the drive shaft S in which vibrations are to be damped. The metallic mass 11 is elastically supported with respect to the drive shaft S by the rubber elastic member 13. Since the degree of interference of the attachment portion 18 is set to a value in the vicinity of 30% which is larger than that of the support portion 16, the diameter of the attachment portion 18 is largely increased in an outer radial direction as shown in FIG. 3, and the rubber elastic member 13 is firmly pressed mainly by the attachment portion 18 against the drive shaft S. Since the simple adhesive agent is applied to the inner peripheral face of the attachment portion 18, the attachment portion 18 is more firmly fixed to the drive shaft S. Although fastening using a fastening band is not applied on the dynamic damper 10, axial movement of the dynamic damper therefore does not occur even when a vibration input from the drive shaft S is applied to the damper. As a result, the attachment position of the dynamic damper 10 with respect to the drive shaft S is stably ensured, and the vibration damping performance of the dynamic damper is adequately maintained.

Furthermore, the dynamic damper 10 can be surely positioned and fixed to the drive shaft S without using a fastening band. Therefore, the cost for a fastening band is cut, and the work of attachment to the driveshaft S is simplified, whereby the cost of the attaching work is reduced.

In the support portion 16 which is placed in the vicinity of the metallic mass 11 on a radially inner side, and which supports the metallic mass 11 via the arm 15, the degree of interference is set to an adequate value or about 10% which is smaller than that of the attachment portion 18. Therefore, collapse due to excessive deformation of the rubber elastic material is prevented from occurring, and the durability is ensured. Moreover, the coupling portion 17 which is thin, and which has the predetermined axial length is disposed between the support portion 16 and the attachment portion 18 of a larger degree of interference, so that the support portion 16 is prevented from being affected by large deformation due to press fitting of the attachment portion 18 onto the drive shaft S. As a result, the support portion 16 is uniformly fixed to the driveshaft S, and hence the stable vibration damping performance of the dynamic damper 10 can be ensured.

In the rubber elastic member 13, the portion of a larger degree of interference is restricted to the attachment portion 18. Therefore, also difficulty of the work of fitting by pressing the rubber elastic member 13 onto the rotary shaft S is reduced. In the embodiment, it is not required to apply an adhesive agent to the metallic mass 11, and hence the reduction of the production cost of the dynamic damper 10 can be realized by the simplification of the production process and the reduction of the material cost.

Next, modification 1 of the embodiment will be described.

Figure 4:
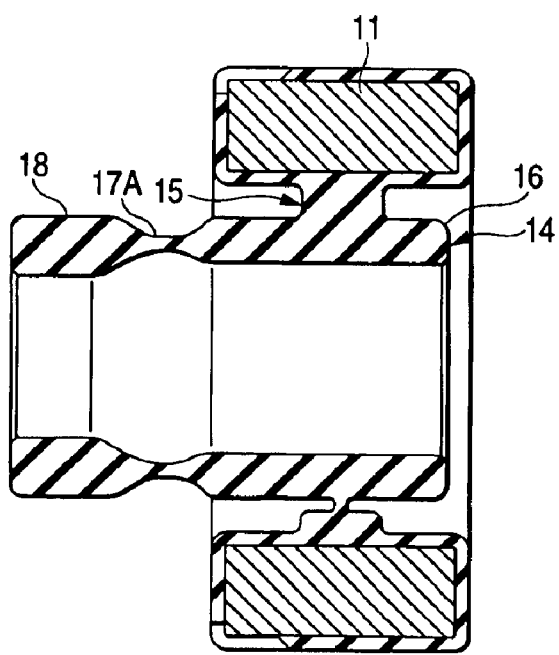
FIG. 4 is a section view taken along the axis showing a dynamic damper of modification 1.

In modification 1, as shown in FIG. 4, a coupling portion 17A is thinned in a further notable manner by forming a recess in inner and outer peripheral faces of the coupling portion. According to the configuration, large deformation of the attachment portion 18 can be surely absorbed by the coupling portion 17A, and hence can be surely prevented from affecting the support portion 16.

Next, modification 2 of the embodiment will be described.

Figure 5:
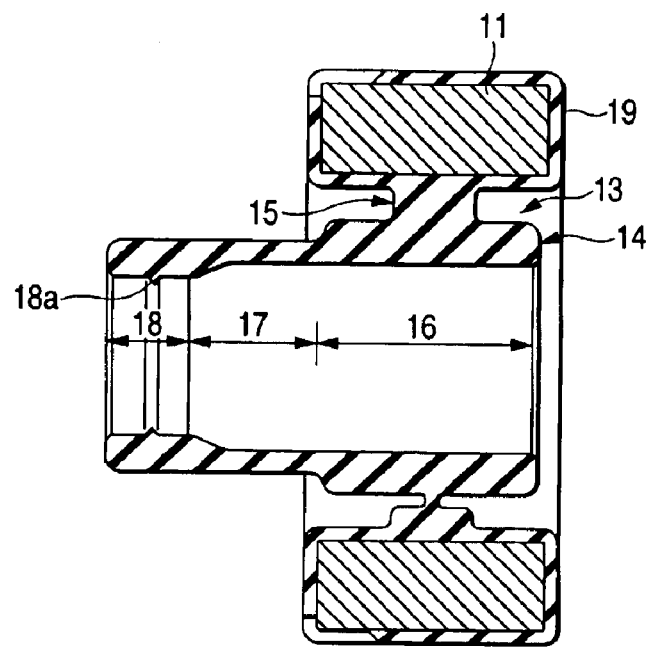
FIG. 5 is a section view taken along the axis showing a dynamic damper of modification 2.

In modification 2, as shown in FIG. 5, an annular projection 18a which is slightly projected is coaxially disposed on the inner peripheral face of the attachment portion 18. According to the configuration, the annular projection 18a is firmly in close contact with the drive shaft S. Therefore, the strength of attachment of the attachment portion 18 to the drive shaft S is further increased, and axial movement of the attachment portion can be suppressed more surely. The number of the projection is not limited to one, and plural projections may be used.

In the first embodiment and the modifications, the coupling portion 17 is thinner than the support portion 16. Alternatively, the coupling portion may be equal in thickness to the support portion 16 as far as the axial length is adequately set so as to prevent the support portion 16 from being affected by deformation of the attachment portion 18.

Figure 6:
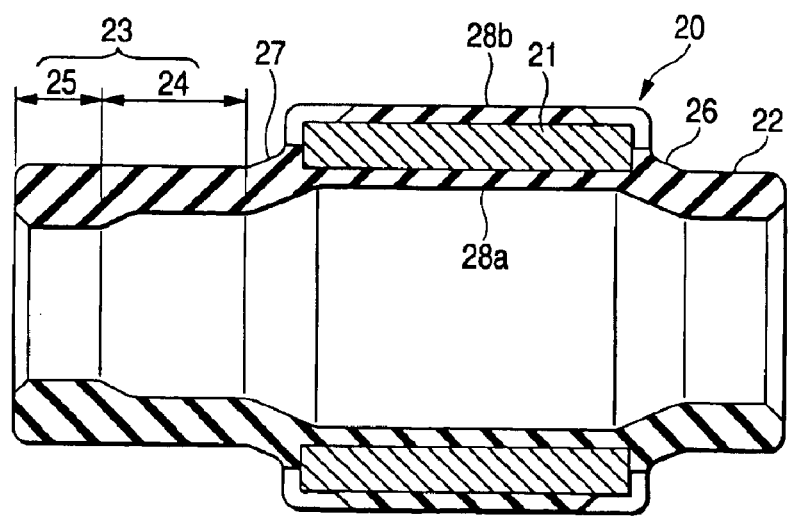
FIG. 6 is a section view taken along the line VI—VI of FIG. 7 showing a dynamic damper which is a second embodiment.
Figure 7:
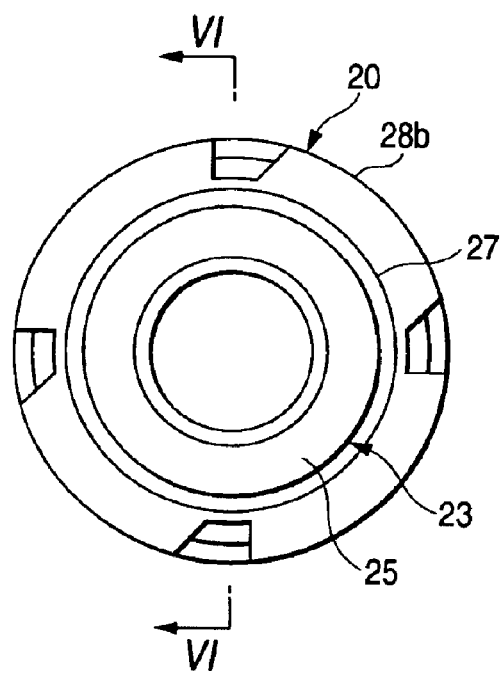
FIG. 7 is a left side view showing the dynamic damper.

Next, a second embodiment will be described with reference to the accompanying drawings. FIGS. 6 and 7 are a section view taken along the line VI—VI and a left side view showing a dynamic damper of the embodiment. The dynamic damper 20 comprises: a cylindrical metallic mass 21; first and second tubular attachment tubes 22 and 23 which are made of a rubber elastic material, and which are coaxially disposed on axially outer sides of the right and left ends of the metallic mass with being separated therefrom by a predetermined distance, respectively; a pair of tubular arms 26, 27 which are made of a rubber elastic material, and which connect the ends of the metallic mass 21 to the first and second attachment tubes 22 and 23 over the whole circumference, respectively; and thin rubber covering layers 28a and 28b which cover the inner and outer peripheral faces of the metallic mass 21, respectively. The first attachment tube 22 and the arm 26, and the second attachment tube 23 and the arm 27 constitute rubber elastic members, respectively. The material and the production method of the metallic mass 21 are identical with those of the metallic mass 11. A through hole may be formed in a part of the metallic mass. In the metallic mass 21, protrusions which are placed with being separated by gaps in the circumferential direction, and which slightly protrude in an axially outward direction may be disposed on the axial end faces. According to the configuration, the integration of the metallic mass and the rubber elastic material is enhanced so that the metallic mass can be prevented from being circumferentially moved even when the metallic mass is not bonded to the rubber elastic member.

The inner diameter of the first attachment tube 22 is smaller than that of the rubber covering layer 28a which covers the inner peripheral face of the metallic mass 21. The second attachment tube 23 has a support coupling portion 24 on the side of the metallic mass 21, and an attachment portion 25 on the axial outer side of the member. In the support coupling portion 24, the axial length is about twice that of the first attachment tube 22, and the inner and outer diameters are substantially equal to those of the first attachment tube 22. In the support coupling portion 24, a part on the side of the metallic mass 21 functions as a support portion, and the other part functions as a coupling portion which absorbs deformation due to press fitting of the attachment portion 25 onto the drive shaft. Namely, the length of the part of the support coupling portion 24 corresponding to a coupling portion corresponds to the buffer length. In the attachment portion 25, the inner diameter is smaller than that of the support coupling portion 24, and the thickness is larger than that of the support coupling portion 24. An end of the support coupling portion 24 on the side of the attachment portion 25 is connected to the attachment portion 25 with forming the inner peripheral face into an arcuate sectional shape.

The inner diameters of the first and second attachment tubes 22 and 23 are smaller than the outer diameter of the drive shaft, and defined by respective degrees of interference with respect to the drive shaft. Usually, the degrees of interference of the first attachment tube 22 and the support coupling portion 24 are about 10%, and may be in the range of 5 to 20%. Usually, the degree of interference of the attachment portion 25 is about 30%, and may be in the range of 20 to 50%.

The pair of tubular arms 26, 27 couple the first and second attachment tubes 22, 23 with the axial ends of the metallic mass 21, and are expanded in a funnel shape with starting from the first attachment tube 22 and the support coupling portion 24 toward the ends of the metallic mass 21, respectively. The inner ends of the arms are coupled integrally with the rubber covering layers 28a, 28b, respectively. The rubber covering layer 28b on the outer peripheral side may be omitted as required. The first and second attachment tubes 22, 23, the pair of arms 26, 27, and the rubber covering layers 28a, 28b are integrated with one another by a vulcanization and molding process while the metallic mass 21 to which an adhesive agent is not applied is placed in molding dies, with the result that the dynamic damper 20 is obtained.

The first and second attachment tubes 22, 23 are fitted by pressing with a manual operation or using a jig onto the outer peripheral face of the drive shaft in which vibrations are to be damped, and to which a press-fitting lubricant is applied, whereby the dynamic damper 20 is fixed to the drive shaft. As a result, the metallic mass 21 is elastically supported with respect to the drive shaft by the first and second attachment tubes 22, 23 and the arms 26, 27. Before the press fitting of the first and second attachment tubes 22, 23 onto the drive shaft, the simple adhesive agent of the treatment liquid type which is composed of a halogenated polymer and polydinitrosobenzene is preferably applied to the inner peripheral face of the attachment portion 25. In the dynamic damper 20, in response to a harmful vibration input such as bending or torsional vibrations produced by rotation of the drive shaft, the pair of arms 26, 27 are shear deformed by a resonance effect due to vibrations of the metallic mass 21, and the vibration input is absorbed and damped by the shear deformation.

Since the degree of interference of the attachment portion 25 is set to a value in the vicinity of 30% which is larger than that of the support coupling portion 24, the second attachment tube 23 is firmly pressed and fixed to the drive shaft by the attachment portion 25. Since the simple adhesive agent is applied to the inner peripheral face of the attachment portion 25, the attachment portion 25 is more firmly fixed to the drive shaft. Although fastening using a fastening band is not performed on the dynamic damper 20, therefore, axial movement of the dynamic damper is suppressed even when a vibration input from the drive shaft is applied to the damper, and the attachment position of the dynamic damper is stably ensured. As a result, the vibration damping performance of the dynamic damper 20 is stably ensured.

In the embodiment also, the dynamic damper 20 can be surely positioned and fixed to the drive shaft without using a fastening band. Therefore, the cost for a fastening band is cut, and the work of attachment to the driveshaft is simplified, whereby the cost of the attaching work is reduced.

In the support coupling portion 24 which supports the metallic mass 21 via the arm 27, the part corresponding to the support portion on the side of the metallic mass 21 has a degree of interference which is set to an adequate value or about 10% that is smaller than that of the attachment portion 25. Therefore, collapse of the rubber elastic material can be prevented from occurring, and the durability is enhanced. Since the support coupling portion 24 has the larger axial length, the part of the support coupling portion 24 corresponding to the support portion is prevented from being affected by large deformation due to press fitting of the attachment portion 25 onto the drive shaft. As a result, the part of the support coupling portion 24 corresponding to the support portion is uniformly fixed to the drive shaft, and hence the stable vibration damping performance of the dynamic damper 20 can be ensured. In the first and second attachment tubes 22, 23, the portion of a larger degree of interference is restricted to the attachment portion 25. Therefore, also difficulty of the work of fitting by pressing the first and second attachment tubes 22, 23 onto the rotary shaft is reduced.

In the embodiment, it is not required to apply an adhesive agent to the metallic mass 21, and hence the reduction of the production cost of the dynamic damper 20 can be realized by the simplification of the production process and the reduction of the material cost. The disposition of the rubber covering layers 28a, 28b protects the metallic mass 21 so as not to be stained and corroded.

Next, modification 3 of the embodiment will be described.

Figure 8:
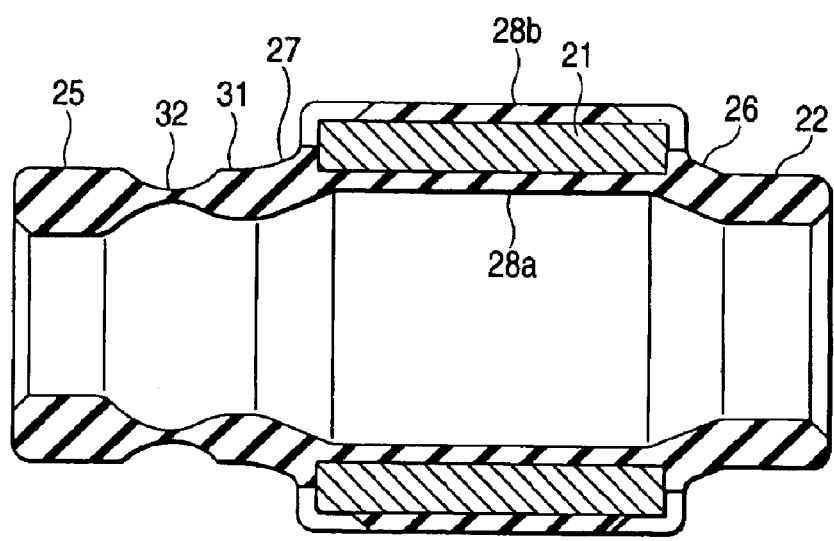
FIG. 8 is a section view taken along the axis showing a dynamic damper of modification 3.

In modification 3, as shown in FIG. 8, the support coupling portion is divided into a thick support portion 31 on the side of the metallic mass 21, and a thin coupling portion 32 by forming a recess in inner and outer peripheral faces of the support coupling portion. According to the configuration, deformation of the rubber elastic material of the attachment portion 25 can be surely absorbed by the thin coupling portion 32, and hence can be surely prevented from affecting the support portion 31.

Next, modification 4 of the embodiment will be described.

Figure 9:
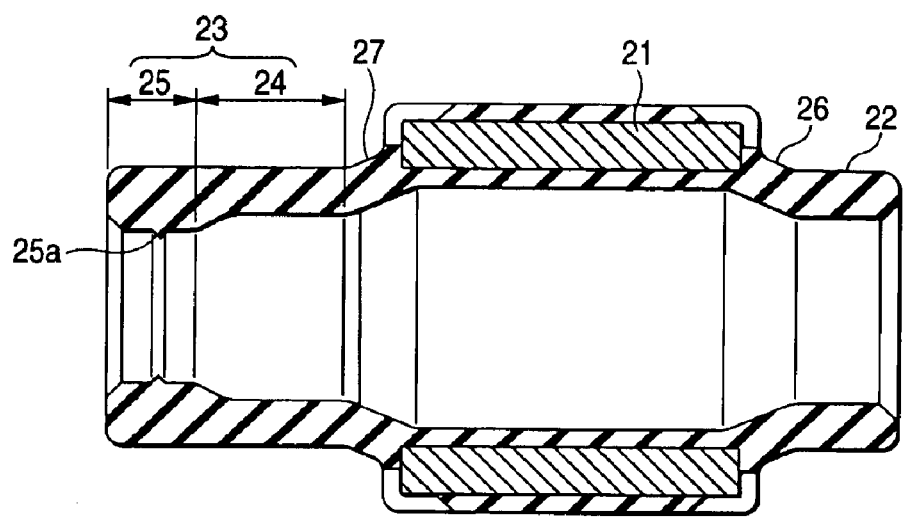
FIG. 9 is a section view taken along the axis showing a dynamic damper of modification 4.

In modification 4, as shown in FIG. 9, an annular projection 25a which is slightly projected is coaxially disposed on the inner peripheral face of the attachment portion 25. According to the configuration, the strength of attachment of the attachment portion 25 to the drive shaft is further increased, and axial movement of the attachment portion can be suppressed more surely. The number of the projection is not limited to one, and plural projections may be used.

In the second embodiment and modifications 3 and 4, the first attachment tube 22 is straightly formed so that the inner and outer diameters of the tube are equal to those of the support coupling portion 24. In the same manner as the second attachment tube 23, alternatively, the first attachment tube may have a support coupling portion on the side of the metallic mass 21, and an attachment portion on the axial outer side of the member. According to the configuration, in the first attachment tube also, axial movement is suppressed without exerting influence of the attachment portion on the part of the support coupling portion corresponding to the support portion, and the attachment position of the dynamic damper 20 with respect to the drive shaft is more stably ensured.

In the embodiments described above, the metallic mass is not bonded to the rubber elastic material. Alternatively, the metallic mass may be bonded to the rubber elastic material as required. The dynamic damper is applied to the use of reducing vibrations of a drive shaft of a vehicle. Alternatively, the dynamic damper may be applied to other similar uses of reducing vibrations. The dynamic dampers of the embodiments are for illustrative purposes only, and the dynamic damper of the invention can be realized in various manners without departing from the spirit of the invention.

According to the invention, the dynamic damper is firmly fixed to the rotary shaft by the attachment portion of the larger degree of interference. Even when a fastening band is not used, therefore, axial movement of the dynamic damper due to a vibration input from the rotary shaft is suppressed, and the attachment position is stably ensured. As a result, according to the invention, the vibration damping performance of the dynamic damper is ensured, the cost for a fastening band can be cut, and the cost of the work of attaching the dynamic damper can be reduced by simplifying the work of attachment to the drive shaft. Since the degree of interference of the support portion which is placed in the vicinity of the metallic mass is smaller than that of the attachment portion, collapse is suppressed, and the durability of the support portion is ensured.

According to the invention, furthermore, the coupling portion prevents the support portion from being affected by compression deformation of the rubber elastic material in the attachment portion. Therefore, the support portion is uniformly fixed to the rotary shaft, and hence the vibration damping performance of the dynamic damper is adequately maintained. In the rubber elastic member, the portion of a larger degree of interference is restricted to the attachment portion. In the entire rubber elastic member, therefore, also difficulty of the work of pressingly fitting onto the rotary shaft can be reduced. The coupling portion may be structured so that the portion is thinner than the support portion and the attachment portion, or has a predetermined buffer length in an axial direction.

In the dynamic damper, since the degree of interference of the support portion is in the range of 5 to 20%, the durability of the support portion member is ensured. Since the degree of interference of the attachment portion is set to 20 to 50%, the strength of attachment of the attachment portion to the rotary shaft is sufficiently ensured, axial movement of the dynamic damper with respect to the drive shaft is suppressed Since the annular projection is disposed on the inner peripheral face of the attachment portion, the attachment portion is more firmly pressed and fixed to the rotary shaft by the projection in addition to the strong pressing force due to the high degree of interference. Since the simple adhesive agent is applied to the inner peripheral face of the attachment portion, the attachment portion is more firmly fixed to the rotary shaft by the adhesive force exerted by the simple adhesive agent in addition to the strong pressing force due to the high degree of interference.

What is claimed is:

1. A dynamic damper for damping vibration of a rotary shaft, comprising:

a tubular mass member; and a rubber elastic member that elastically supports the mass member on the rotary shaft, the rubber elastic member including an attachment tube and an arm both made of a rubber elastic material, the attachment tube disposed coaxially with the mass member but nearer to an axial center thereof than the mass member, the attachment tube to be press-fitted onto an outer peripheral face of the rotary shaft, the arm connecting the attachment tube to the mass member;

wherein the attachment tube comprises: a tubular support portion including a part connected to the arm; a tubular attachment portion; and a tubular coupling portion for coupling the tubular support portion with the tubular attachment portion, wherein the tubular coupling portion is thinner than the tubular support portion and the tubular attachment portion, and the tubular support portion has a shoulder provided on an end coupled to the tubular coupling portion; and the tubular attachment portion has larger interference than the tubular support portion where the interference is a value obtained by dividing a difference between an inner diameter before press-fitting onto the rotary shaft and an outer diameter of the rotary shaft by the inner diameter before press-fitting.

2. A dynamic damper for damping vibration of a rotary shaft, comprising:

a tubular mass member; and a rubber elastic member that elastically supports the mass member on the rotary shaft, the rubber elastic member including an attachment tube and an arm both made of a rubber elastic material, the attachment tube disposed coaxially with the mass member but nearer to an axial center thereof than the mass member, the attachment tube to be press-fitted onto an outer peripheral face of the rotary shaft, the arm connecting the attachment tube to the mass member;

wherein the attachment tube comprises: a tubular support portion including a part connected to the arm; a tubular attachment portion; and a tubular coupling portion for coupling the tubular support portion with the tubular attachment portion, wherein the tubular coupling portion is thinner than the tubular support portion and the tubular attachment portion, and the tubular support portion has a shoulder provided on an end coupled to the tubular coupling portion;

the tubular attachment portion has larger interference than the tubular support portion where the interference is a value obtained by dividing a difference between an inner diameter before press-fitting onto the rotary shaft and an outer diameter of the rotary shaft by the inner diameter before press-fitting; and the tubular coupling portion is formed to prevent the tubular support portion from being affected by deformation of the tubular attachment portion due to press-fitting onto the rotary shaft.

* * * * *